June 17, 1947.   O. SPENCE   2,422,504
RECOVERY OF LOWER ALIPHATIC ACIDS FROM DILUTE AQUEOUS SOLUTION
Filed Feb. 5, 1944
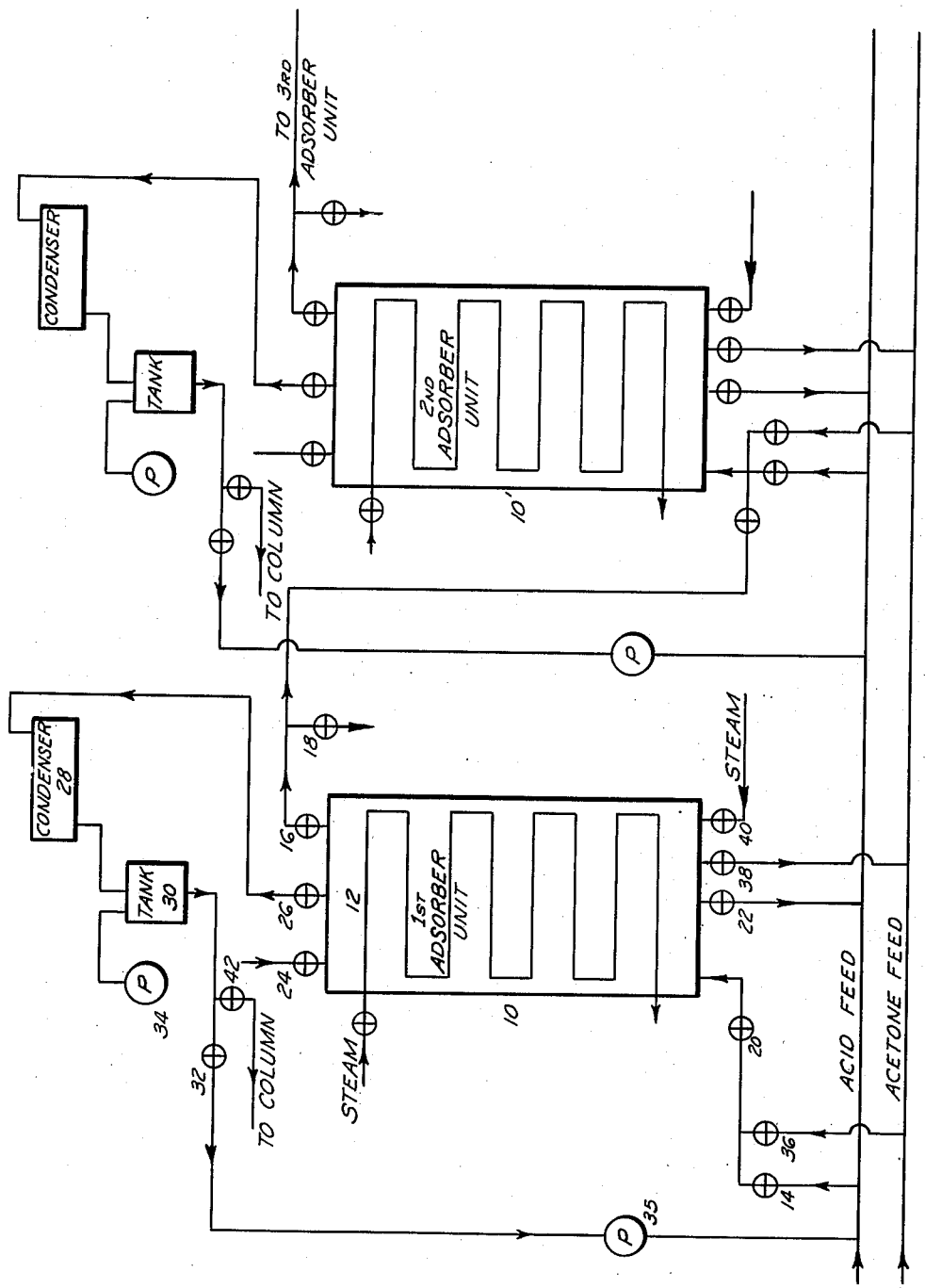
INVENTOR.
OSWALD SPENCE
BY H. H. Dyke
ATTORNEY Patented June 17, 1947

2,422,504

UNITED STATES PATENT OFFICE 2,422,504

RECOVERY OF LOWER ALIPHATIC ACIDS FROM DILUTE AQUEOUS SOLUTION

Oswald Spence, Laurel, Miss., assignor to Masonite Corporation, Laurel, Miss., a corporation of Delaware Application February 5, 1944, Serial No. 521,211

4 Claims. (Cl. 260—540)

This invention relates to a process for recovery of lower fatty acids, such as acetic, formic, and propionic acids, from dilute aqueous solutions; and more particularly relates to the taking up of lower fatty acids by activated carbon from dilute solutions, and the subsequent recovery of the acids from the carbon in a relatively concentrated form.

Various modes have been used for recovery of lower fatty acids from aqueous solutions, and the acid concentration at which they are economical and therefore available is dependent upon various factors including cost of steam, power, condensing water, equipment and the like. When relatively little water is present in solutions of acids, such as acetic, further concentration can be effected by ordinary fractionation procedures without use of an excessive amount of heat and in fractionating columns of reasonable size. With more dilute acids, solvent extraction by materials such as toluene, furfural, and the like, is resorted to instead of fractional distillation because the heat requirements for distillation of the dilute solutions would be excessively high. However, below about 10% acid concentration, cost of solvent extraction increases rapidly. For reasons such as these, recovery of these acids below 10% concentration involves high cost, and their recovery from very dilute solutions, as 2% concentration or less, has not been considered economical, and such solutions have usually been discarded.

One object of this invention is to provide a method for economically reclaiming lower fatty acids from dilute aqueous solutions in which the acid concentration is below about 10%, and especially from solutions having acid concentration of about 6% and below. Another object is to eliminate steps in the recovery operations which require large quantities of heat. A further object is to provide a procedure for recovery of such acids which have been taken up from dilute solutions by activated carbon, whereby solutions of increased acid concentration are obtained.

In carrying out the invention, the dilute acid solutions are preferably passed through a bed of activated carbon preferably at room temperature or below. The carbon takes up the acid by adsorption and retains a greater percentage of the acid content of the solution than of its water content. As the flow of dilute acid of any given concentration is continued through the bed, the carbon retains more and more acid until a maximum is reached, after which the carbon will no longer retain additional acid. After further concentration through application of heat, the adsorbed acid and any absorbed acid is removed from the carbon by elution with a liquid organic compound in which the acids are soluble, or is removed by the action of fluid vapors of relatively high-boiling organic compounds being passed through the carbon. The fatty acids are finally separated from the fluid compounds which were used to remove them from the carbon. This can be done by ordinary fractionation procedure.

Solutions suitable for concentration by use of the present invention may consist of by-product acid solutions from the production of furfural, as described in pending application Ser. No. 352,399, filed August 13, 1940. Suitable solutions from destructive distillation of wood or from any other source may be concentrated.

The dilute aqueous solutions from which the acids are recovered should preferably be relatively pure. If tarry materials are present in the solutions, for example, the carbon will adsorb tars, and the efficiency of the adsorption capacity of the carbon may be materially reduced. Such tarry materials may, however, be removed from the carbon by reactivating the carbon or through the use of suitable solvents. It is preferable to use distillates from such tarry solutions for concentration treatment, thus eliminating the step of removing tars from the carbon.

The acid is taken up by the carbon in two ways. One of these appears to consist of mere absorption, or filling of voids of the carbon with the acid solution, without change in the acid concentration thereof. The other differs from mere absorption by being preferential, that is, relatively more acid than water is taken up. It is the latter mode of take-up, herein termed adsorption, that makes it possible to increase the acid concentration.

For convenience, the process steps for recovery of acetic acid from a dilute aqueous solution will be described, but substantially the same procedure can be used in recovery of any lower fatty acids or mixtures thereof from dilute solutions.

The attached drawing shows a schematic arrangement to assist in obtaining an understanding of the process. Two adsorber units are indicated and enough piping, etc., to be useful in describing the process steps, but any desired number of units may be used with various connections, etc., as may be needed.

The adsorber unit 10, preferably made of material resistant to acids, is fitted with a steam heating coil 12. Activated carbon having particle sizes preferably of about 8 to 14 mesh is packed into the unit, the steam heating coil 12 being arranged to have good contact with the carbon.

The acetic acid feed solution is supplied at 14. It is preferably pumped in at the bottom of the adsorber unit and removed at the top through valve 16. As the acid solution moves upward through the unit, the activated carbon will take up acetic acid and water from the solution.

At first, the material flowing out through valve 16 is water substantially free of acid, and may be removed from the system at outlet valve 18 and discarded. When the acid concentration in the solution flowing from the outlet 18 has increased to about .05%, outlet 18 is closed and the flow through valve 16 is directed to another adsorber unit, as 10'. The operation may, if desired, be continued until substantial equilibrium has been established in the first unit; that is, until the acid concentration of the solution flowing out at 16 is approximately equal to the acid concentration of the feed solution entering at 14, thus indicating that no more acid is being taken up by the carbon. However, the flow through the first or any other unit may be discontinued prior to attaining such equilibrium, and this may be done as soon as the adsorption of acids in the unit is no longer proceeding efficiently. This is accomplished by closing valves 16 and 20, and directing the feed solution to another adsorber unit, unit 10 being by-passed.

The solution remaining in the first unit is now drained off by opening valve 22 and air inlet valve 24, and the drained solution is returned to the feed solution for recycling.

The total take-up of acid and water is quite considerable, being usually approximately equal to the dry weight of the carbon. Using feed solution of about 4% acid concentration, it was found that the preferential action above referred to was so considerable that the weight of the acetic acid in the solution retained by the carbon after draining was about 24% on the dry weight of carbon, that is to say, its acid concentration was about 6 times that of the feed solution; with a feed solution of 1% acid concentration, the acid concentration of the solution retained by the carbon was 16%, i. e., increased about 16 fold; and with a feed solution of .05% acid concentration, the acid concentration of the solution retained by the carbon was about 5%, an increase of 100 fold. Thus the adsorbing effect of the carbon is outstandingly effective when treating feed solutions of very low acid concentration.

The acid concentration of acid solution retained by the carbon after draining can be increased by heating, as for example by passing stream through the heating coil 12. The vapors so produced leave the body of the unit at 26 and are condensed in condenser 28. The condensed vapors are collected in tank 30. By carrying out the heating of the carbon under reduced pressure the concentration of the acid on the carbon can be increased with practically minimum loss of acid. Vacuum pump 34 is provided to reduce the pressure in the system when vacuum concentrating is used. The condensates collected in tank 30 are returned to the acid feed line for recycling through valve 32 and pump 35. In this way considerable water can be removed from acid solutions without substantial loss of acid through decomposition or vaporization.

The concentrating effect of the acid on the carbon through heat is illustrated by the following example. Dilute acetic acid solution was contacted with carbon until the adsorption of acid by the carbon was no longer highly efficient, and then the solution was drained off. After draining, 100 parts of carbon retained about 30 parts of acetic acid and 65 parts of water. The concentration of the acid based on the total acid and water retained by the carbon was approximately 31%. Upon application of sufficient heat to remove about 32 parts of water, about 3 parts of acid were also removed with the water. The concentration of the acid based on total acid and water still remaining on the carbon was approximately 45%.

Ordinarily the acid concentration need not be carried beyond 40% to 50%, such acid solutions being readily rectified to higher acid concentrations. However, higher acid concentrations on the carbon can be obtained, and when such higher concentration is desired it is preferable to remove the water under reduced pressure as described above.

The concentrating of the acid on the carbon by the use of vacuum distillation is illustrated in the following example. Dilute acetic acid solution was contacted with carbon until the adsorption of acid was no longer highly efficient, and then the solution was drained off. After draining, 100 parts of the carbon retained about 30 parts of acetic acid and 55 parts of water. The concentration of the acid based on total acid and water on the carbon was approximately 35%. The carbon was then subjected to vacuum distillation under about 20 mm. of mercury and at a temperature of about 100° C. About 55 parts of water and acid were thus removed as vapor, of which about 51 parts were water and about 4 parts were acetic acid. The concentration of the acid based on total acid and water remaining on the carbon after the vacuum distillation was approximately 97% or substantially glacial acetic acid.

In another example using vacuum distillation, dilute formic acid solution was placed in contact with activated carbon until the adsorption of acid was no longer highly efficient, and then the solution was drained off. After draining, 100 parts of the carbon retained about 21 parts formic acid and 64 parts water. The concentration of the acid based on total acid and water on the carbon was approximately 25%. The carbon was then subjected to vacuum distillation under about 20 mm. of mercury at a temperature of about 100° C. About 62.5 parts of water and acid were removed as vapors, of which about 58.5 parts were water and about 4 parts were formic acid. The concentration of the acid based on total acid and water remaining on the carbon after the vacuum distillation was approximately 75%.

When the drying has been carried to the desired extent, the acid may be eluted from the carbon by means of a liquid organic compound in which acetic acid is soluble, and which will remove and displace the acetic acid taken up by the carbon, and which is passed through the adsorber unit. The acids may also be efficiently removed by passing vapors of organic compounds, having a relatively high boiling point, through the carbon. The hot vapors of the organic compounds are preferably passed into the adsorber unit at the bottom. The hot organic vapors will vaporize the acids retained by the carbon and such acid and organic vapors will pass from the unit at 16. The acid-carrying vapors are removed from the system at 18 and their separation may be effected in a fractionating column (not shown). The high boiling organic compound remaining on the carbon after removal of the acid may be removed with steam. However, in practice I prefer to remove the acids from the carbon by elution with liquid organic solvent material, and while other organic solvents may be used, acetone is preferred.

The acetone enters the body of the unit 10 at 36 and leaves at 16. As the acetone moves upward through the adsorber unit, the acetic acid and remaining water associated with the carbon are removed from the carbon, being replaced by acetone. The principal part of the acetone which contains the materials eluted from the carbon is discharged from the unit at 16 and removed from the system at 18. The acid concentration of this out-going mixture, which at first is relatively high, decreases as elution of acid proceeds. When the acid concentration of the out-going mixture gets too low for economical recovery of acids therefrom, the out-going mixture is fortified by being routed through one or more additional adsorber units in the series. In this way, substantially all the acid can be removed from the carbon in each unit, without excessively reducing the acid concentration of the acetone-acetic acid mixture. This mixture is preferably sent to distilling apparatus (not shown) for recovery of concentrated acid to be sent to storage, and the acetone separated to be returned to the system for re-use.

After the acetic acid has been eluted from the carbon as described, acetone is drained out of the unit by opening outlet valve 38 and air valve 24 and returned to the acetone feed line.

In order to remove the remaining acetone from the carbon after draining the acetone from the unit, steam is passed through the body of the adsorber unit, being admitted at 40. The steam and acetone vapors pass out at 26 and are condensed in condenser 28. The acetone-acetic solution is collected in tank 30 and may then be passed to a fractionating column (not shown) by opening valve 42. After separating the acetone from the water, the acetone may be returned to the acetone feed.

The carbon used in the adsorber unit may be any good grade solvent adsorbent carbon, such as "Columbia" activated carbon. In order to get good flow of liquids and of steam through the carbon bed in various steps of the operation, and at the same time obtain satisfactory take-ups from acid solutions, it is ordinarily preferable to use carbon of about 8 to 16 mesh.

Other organic compounds than acetone which I have found suitable for eluting acid from the carbon are isopropyl ether, methyl ethyl ketone, furfural, ethylene dichloride, methyl amyl ketone, ethyl acetate, ethyl ether, benzene and toluene. Any organic compound in which the lower fatty acids are soluble and which will elute the acids from the carbon, and which can readily be separated from acetic acid by fractional distillation, may be used for this purpose. The step of elution is preferably carried out with an eluting agent at temperatures somewhat higher than room temperature.

Vapors of relatively high boiling organic compounds which I have found suitable for removing acids from the carbon, include butyl ether, ortho dichloro benzene, furfural under reduced pressure, butyl cellosolve and ethyl cellosolve. Any organic compound, which has a boiling point above the boiling point of the acids and below the decomposition point of the acids and which will not react with the acids, may be used for this purpose.

It will be seen that my process is particularly well adapted for acid recovery from very dilute feed solutions, and further that its utility is greatest with feed solutions having an acid concentration of about 10% or less. The acid concentration of the solution retained by the carbon bears a high ratio to the acid concentration of very dilute feed solutions. The retained acids are then additionally concentrated by heating, and removed from the carbon at such relatively high concentration by means of suitable solvent liquids or vapors. As about 10% acid concentration of feed solutions is approached, the advantages of the process are no longer present to the same extent as with more dilute feed solutions because of the relatively large part of the acid that is absorbed by the carbon and which is carried through the process without securing the full concentrating effect that is obtained with the adsorbed acid.

It is to be understood that my invention includes modifications falling within the spirit and scope of my claims, and is not limited by possible flaws in theories which I have expressed in relation to adsorption, absorption, elution and the like, for the purpose of affording a better understanding of the invention.

I claim:

1. The process of recovering lower fatty acids from a dilute aqueous solution, which comprises passing the solution through activated carbon whereby fatty acids and water are retained by the carbon in a higher state of acid concentration, subjecting the carbon to vacuum distillation at a temperature of about 100° C. until the water is substantially all removed, recovering the concentrated acid from the carbon by extraction with an organic solvent, and separating the acids from the organic solvent.

2. The process as defined in claim 1, and in which the organic solvent is acetone.

3. The process as defined in claim 1, and in which the organic solvent is furfural.

4. The process as defined in claim 1, and in which the organic solvent is ethylene dichloride.

OSWALD SPENCE.

REFERENCES CITED

The following references are of record in the file of this patent:

UNITED STATES PATENTS

| Number | Name | Date |
|---|---|---|
| 2,255,235 | Wentworth | Sept. 9, 1941 |
| 1,952,845 | Dreyfus | Mar. 27, 1934 |
| 1,792,113 | Mugdan et al. | Feb. 10, 1931 |
| 595,787 | Schmidt | Dec. 21, 1897 |
| 1,904,495 | Mauger | Apr. 18, 1933 |
| 2,254,745 | Jannek | Sept. 2, 1941 |
| 2,343,165 | Adler | Feb. 29, 1944 |

OTHER REFERENCES

Surun, Compt. rend. (Fr. Acad. Sci.), vol. 182, pp. 1544–6.

Fromageot et al., Compt. rend. (Fr. Acad. Sci.), vol. 179, pp. 972, 974 (1924).

Ruff, Chem. Abst., vol. 30, col. 6864 (1936).

Alekseevskii et al., Chem. Abst., vol. 30, col. 4375 (1936).

Holmes et al., J. Phys. Chem., vol. 32, pp. 1522–3 (1928).

Dobine, Ruff, Chem. Abst., vol. 32, col. 1540 (1938).

Rordorf, Chem. Abst., vol. 33, col. 1953 (1939).